United States Patent
Bell et al.

(10) Patent No.: US 10,365,954 B1
(45) Date of Patent: Jul. 30, 2019

(54) USING VIRTUAL MACHINES TO MANAGE OTHER VIRTUAL MACHINES IN A DEVELOPMENT ENVIRONMENT

(71) Applicant: INTUIT INC., Mountain View, CA (US)

(72) Inventors: Chad Bell, San Diego, CA (US); Vinay Kumar, San Diego, CA (US); Ryan Lynch, San Diego, CA (US); Joseph Elwell, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 183 days.

(21) Appl. No.: 15/476,592

(22) Filed: Mar. 31, 2017

(51) Int. Cl.
*G06F 9/46* (2006.01)
*G06F 9/50* (2006.01)
*G06F 8/30* (2018.01)
*G06F 9/455* (2018.01)
*G06F 8/60* (2018.01)

(52) U.S. Cl.
CPC .............. *G06F 9/5077* (2013.01); *G06F 8/30* (2013.01); *G06F 8/60* (2013.01); *G06F 9/45504* (2013.01)

(58) Field of Classification Search
CPC .. G06F 3/0647; G06F 9/45558; G06F 3/0604; G06F 3/0683; G06F 2009/4557; H04L 67/148
USPC .......................................................... 718/1
See application file for complete search history.

(56) References Cited

U.S. PATENT DOCUMENTS

| 8,219,987 B1 * | 7/2012 | Vlaovic | G06F 9/448 |
| | | | 718/1 |
| 9,032,373 B1 * | 5/2015 | Gupta | G06F 11/3688 |
| | | | 717/127 |
| 9,722,946 B1 * | 8/2017 | Mahapatra | H04L 47/70 |
| 9,778,952 B1 * | 10/2017 | Sutton | G06F 9/4856 |

* cited by examiner

*Primary Examiner* — Camquy Truong
(74) *Attorney, Agent, or Firm* — Patterson + Sheridan LLP

(57) ABSTRACT

The present disclosure relates to providing a virtual development environment by receiving a request for a development environment from a user, identifying resources from the request and resource on which the requested resource depends, and obtaining virtual machine images for each resource from a repository. The virtual machine images are executed in separate virtual machines to provide a development environment and related resources to the user.

20 Claims, 4 Drawing Sheets

USING VIRTUAL MACHINES TO MANAGE OTHER VIRTUAL MACHINES IN A DEVELOPMENT ENVIRONMENT

BACKGROUND

Field

Embodiments presented herein generally relate to establishing and managing software development environments, and more specifically to ensuring that services used by various virtual machines in a development environment are active so that developers can interact with a development environment.

Description of the Related Art

Development environments generally include various components that are installed on a developer's local computer to allow a developer to modify program components (e.g., source code, graphical user interface (GUI) design, operational parameters, and so on) and test modifications to the program components. These components can include shared libraries used by multiple programs in a development environment, integrated development environment tools (including, for example, compilers, interpreters, debuggers, code editing components, and user interface design tools), source code for projects under development, test versions of services on which projects under development depend, and so on. In some cases, development environments may connect to various source code repositories to obtain the source code for a project under development. Modifications to the source code may be performed on a developer's local computer and, after testing, be committed back to the source code repository as a new version of the source code.

Setting up a development environment on a local computer can be a time consuming task. In some cases, setting up a development environment on a local computer may result in conflicts between different versions of shared libraries used by different components in the development environment. These dependency conflicts may, in some cases, break the functionality of one or more software components on a local computer. In such a case, a developer may need to troubleshoot various programs on the local computer to identify and fix problems that arise when the developer sets up a development environment on the local computer. In some cases, dependency conflicts and other issues arising from setting up a development environment on a local computer may be severe enough that fixing the dependency conflicts or other issues may entail restoring the local computer to a previous operating state (e.g., from a backup of the local computer performed before the developer attempted to set up a development environment).

Additionally, when developers independently set up development environments on their own local computers, different developers may use different, and potentially incompatible, versions of development tools and development projects. Because the development environments deployed on different local computers used by different developers may be incompatible, solutions developed to address problems on a single developer's local computer may not be applicable to other developer computers.

SUMMARY

One embodiment of the present disclosure includes a method for providing a virtual development environment including receiving a request for a development environment at a first virtual machine and identifying one or more resources in the request. The method also includes retrieving configuration data for a resource from a configuration data store, where the configuration data includes a dependent resource, and obtaining a virtual machine image corresponding to the resource and the dependent resource. The method further includes executing the virtual machine image of the resource and the virtual machine image of the dependent resource in a virtual machine execution space, and providing the development environment to the user with the virtual machine of the resource and the virtual machine of the dependent resource.

Another embodiment provides a computer-readable storage medium having instructions, which, when executed on a processor, performs an operation for providing a virtual development environment. The operation generally includes receiving a request for a development environment at a first virtual machine and identifying one or more resources in the request. The operation also includes retrieving configuration data for a resource from a configuration data store, where the configuration data includes a dependent resource, and obtaining a virtual machine image corresponding to the resource and the dependent resource. The operation further includes executing the virtual machine image of the resource and the virtual machine image of the dependent resource in a virtual machine execution space, and providing the development environment to the user with the virtual machine of the resource and the virtual machine of the dependent resource.

Still another embodiment of the present invention includes a processor and a memory storing a program, which, when executed on the processor, performs an operation for providing a virtual development environment. The operation generally includes receiving a request for a development environment at a first virtual machine and identifying one or more resources in the request. The operation also includes retrieving configuration data for a resource from a configuration data store, where the configuration data includes a dependent resource, and obtaining a virtual machine image corresponding to the resource and the dependent resource. The operation further includes executing the virtual machine image of the resource and the virtual machine image of the dependent resource in a virtual machine execution space, and providing the development environment to the user with the virtual machine of the resource and the virtual machine of the dependent resource.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
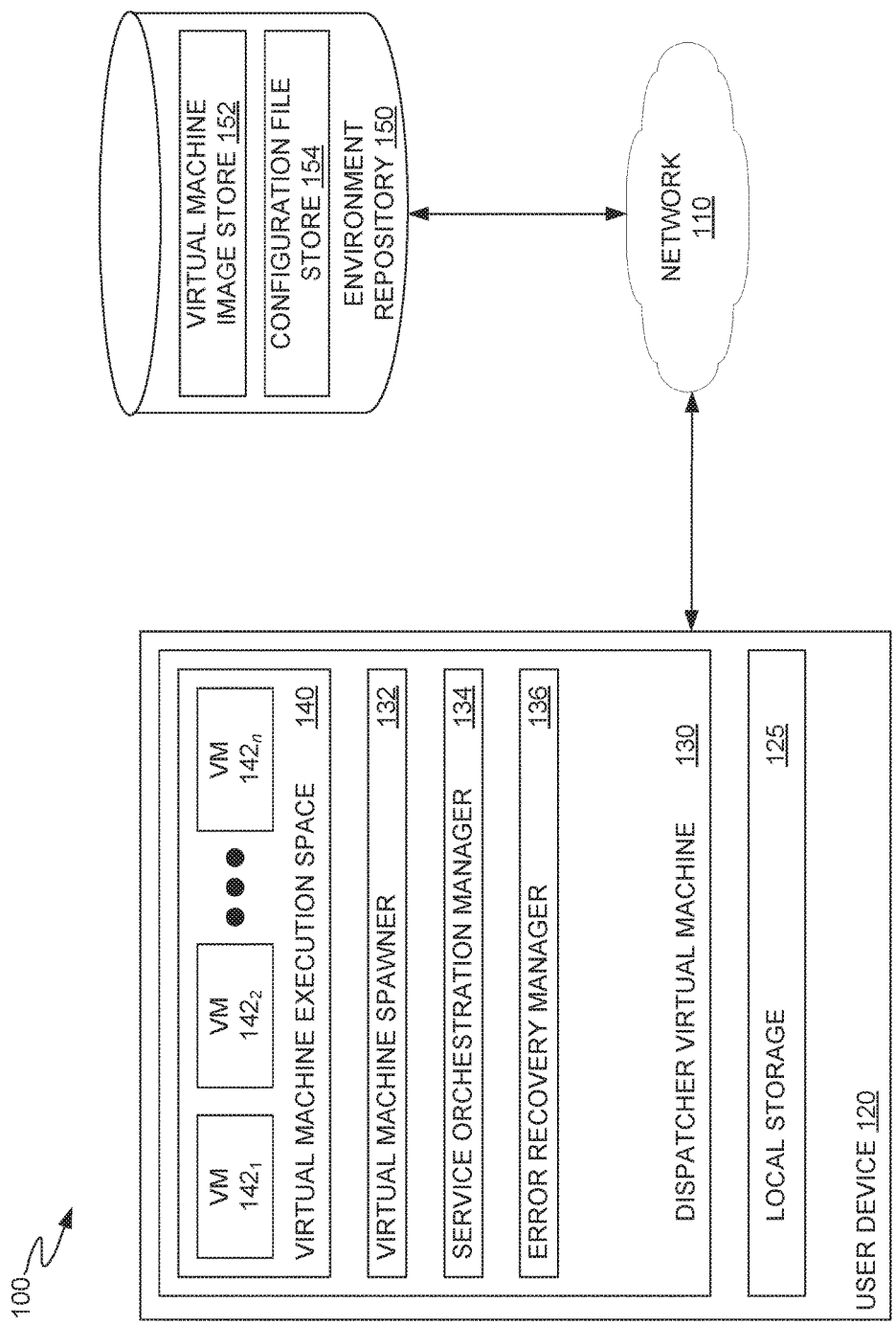
FIG. 1 illustrates an example computing environment, according to one embodiment.

Virtualization generally allows for the use of virtual machines to execute software in an environment segregated from the operating system and hardware executed by a host machine. In a virtualized computing system, a host machine provides execution environments in which one or more virtual machines, or guest systems, execute. The execution environments generally are software constructs that provides expected hardware functionality to an operating system executing on a virtual machine through emulation of a basic computing system or, in some cases, direct access to various hardware components of the host machine. Each virtual machine executing on a host machine generally stores data on a virtualized hard drive, which may be an emulated storage device that appears to be a hard drive or other storage device to a virtual machine but may be stored as one or more files on the storage devices connected to the host machine (e.g., a local hard drive, removable storage, or network attached storage).

Because virtual machines generally isolate the operations of a guest operating system and the applications deployed thereon from affecting the configuration of a host machine, deploying a development environment using virtual machines may prevent shared libraries deployed on a virtual machine from conflicting with dependencies that exist on a host machine. Additionally, because of the isolation properties of virtual machines, problems that arise within the virtual machine may affect the virtual machine itself (e.g., cause stop errors or other errors that may be fixed by rebooting the virtual machine) but may not adversely affect the functionality of the host machine. Further, host machines may not be adversely affected by corruption or modifications that cause instability in a virtual machine. To remedy such problems, the host machine need not be modified. To fix corruption or stability problems in a virtual machine, the virtual machine can be replaced by overwriting a virtual hard drive file associated with the virtual machine with a new virtual hard drive file.

The properties of virtual machines and virtualization provide a platform for centrally managing development environments using virtual machines. Pre-configured virtual machines may be established for components of a development environment that developers can use to modify and test software under development. For example, some virtual machines may be configured to run test versions of services under development, while other virtual machines may be configured to run stable versions of service dependencies, or services that are used by the software under development. Because these virtual machines may be pre-configured, a user need not perform additional configuration in order to use the development environments provided by these virtual machines. Using these virtual machines, technical and non-technical developers can quickly provision development environment from a plurality of pre-configured virtual machines, and the resulting development environment may be isolated from the developers' local computers and easily maintainable (e.g., through replacement of outdated or malfunctioning virtual machine images with more recent virtual machines or versions of virtual machines that are known to work).

Embodiments of the present disclosure provide techniques for provisioning virtual machines to provide a stable development environment. Management of service dependencies may entail, as described in further detail herein, examining a development environment to identify whether services upon which different virtual machines in a virtual environment depend are active.

FIG. 1 illustrates an example computing environment for establishing a virtualized development environment. As illustrated, computing environment 100 includes a user device 120 and an environment repository 150, connected via network 110.

As illustrated, user device 120 includes local storage 125 and a dispatcher virtual machine 130. Local storage 125 may be a hard drive, solid state drive, or other electronic storage on which dispatcher virtual machine 130 and components thereof can store and modify virtual machine images used to provision a development system for a user of user device 120. Local storage 125 may additionally provide a user-accessible storage repository for development project files (e.g., program source code, user interface files, configuration files, and other code components of a development project). As discussed in further detail herein, one or more virtual machines 140 executing within dispatcher virtual machine 130 can access development project files to save changes to program source code on user device 120, test software using program source code saved in local storage 125, and commit tested changes to a source code repository associated with a development project.

Dispatcher virtual machine 130 may be a virtual machine configured to manage the deployment of various components of a development platform on user device 120, according to an embodiment. In managing the deployment of a development platform, dispatcher virtual machine 130 can isolate operation of the various components of a development project from each other and from affecting the configuration of user device 120, as components of the development project may be executed in independent virtual machines within a virtual machine execution space provided by dispatcher virtual machine 130. As illustrated, dispatcher virtual machine includes a virtual machine spawner 132, service orchestration manager 134, error recovery manager 136, and virtual machine execution space 140.

Virtual machine spawner 132 generally obtains virtual machine images from a central repository (e.g., environment repository 150) and spawns virtual machines based on the obtained virtual machine images. In some cases, virtual machine spawner 132 can generate a user interface for display on user device 120 that illustrates the development virtual machines that dispatcher virtual machine 130 can obtain from a central repository and execute in virtual machine execution space 140. A developer can select resources needed for a project and dispatcher virtual machine 130 obtains and executes those resources using virtual machine spawner 132.

Service orchestration manager 134 generally monitors user selections of the virtual machines to be spawned in virtual machine execution space 140 to determine if service dependencies have been satisfied, according to an embodiment. Error recovery manager 136 generally monitors the operational status of one or more virtual machines 142 executing in virtual machine execution space 140 for system errors and attempts to automatically rectify system errors.

Virtual machines 142 spawned by virtual machine spawner 132 generally execute within virtual machine execution space 140, which provides an isolated container in which each virtual machine 142 executes until a virtual machine 142 is terminated (e.g., shut down). The containers provided by virtual machine execution space 140 generally expose, to a virtual machine 142, a virtualized computer including an input/output system, one or more processors, temporary memory, persistent storage, access to networked storage, and so on. When a user selects a virtual machine 142 for termination, virtual machine 130 can shut down the selected virtual machine 142 and terminate the execution space allocated to the selected virtual machine, which frees up resources that can be allocated to a virtual machine execution space for another virtual machine.

Environment repository 150 generally is a repository that stores files that can be used by dispatcher virtual machine 130 to deploy a development environment. As illustrated, environment repository 150 includes virtual machine image store 152 and configuration file store 154.

Virtual machine image store 152 may include versioned copies of virtual machines associated with one or more development tools or services that can be deployed by dispatcher virtual machine 130 as part of a virtual development environment on a user machine. In some cases, virtual machine image store 152 may comprise independent repositories, with each repository being associated with a specific program deployed on a virtual machine. Virtual machine images stored in virtual machine image store 152 may, in some cases, be versioned, with the version information associated with each version of a virtual machine image indicating whether the virtual machine image represents a virtual machine with the latest stable release of a program, a previous release, or a pre-production release of the program that includes features that are under testing.

Configuration file store 154 generally provides a repository that stores configuration files associated with virtual machine images stored in virtual machine image store 152. As discussed, the configuration files stored in configuration file store 154 may indicate, to virtual machine spawner 132, resources to allocate to an execution space in which virtual machine 142 executes. In some cases, the configuration files stored in configuration file store 154 may further indicate the services that programs executing on a virtual machine 142 depend on. Information about the services that a program depends on may be used by service orchestration manager 134 to verify that the specified services are active and, if not, spawn one or more virtual machines to activate the specified services and connect those services to a virtual machine 142 that is executing the program.

Figure 2:
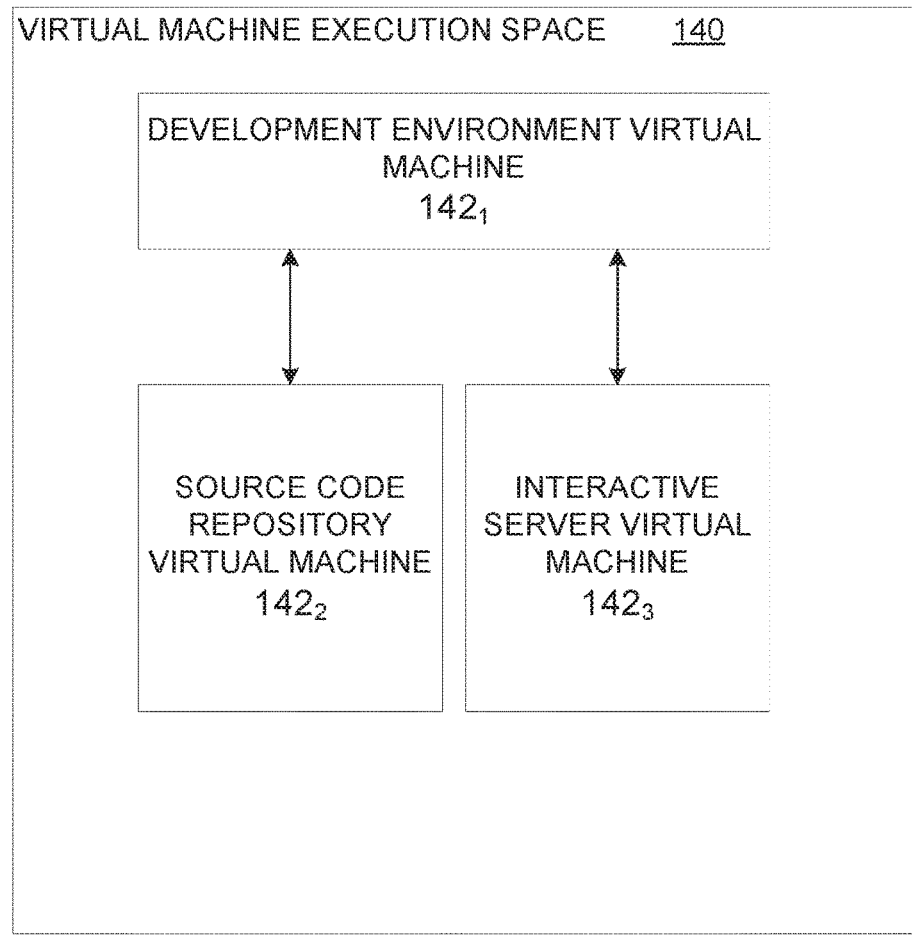
FIG. 2 illustrates an example virtual machine execution space, according to one embodiment.

FIG. 2 illustrates an example virtual machine execution space 140 including a development environment virtual machine $142_1$, a source code repository virtual machine $142_2$, and an interactive server virtual machine $142_3$. Development environment virtual machine $142_1$ uses code files from source code repository virtual machine $142_2$ during development—i.e., adding, deleting, and modifying code files to make changes to the program. Development environment virtual machine $142_1$ uses interactive server virtual machine $142_3$ when testing and debugging the program during development to simulate external resources that the program interacts with, such as databases, authentication servers, or other network resources. When the user requests additional resources, such as an additional or different service, For example, a developer who wants to make changes to a user interface of an income tax preparation program in a development environment initializes the dispatcher virtual machine 130 on the developer's user device 120, such as, for example, a laptop computer. Dispatcher virtual machine 130 communicates with environment repository 150 to access configuration file store 154 to retrieve the resources and services that the development environment and income tax preparation program require. Specifically, dispatcher virtual machine 130 uses service orchestration manager 134 to obtain the development environment program as a virtual machine image from virtual machine image store 152. Virtual machine spawner 132 executes the development environment image in virtual machine execution space 140 as the development environment virtual machine $142_1$.

Once development environment virtual machine $142_1$ is running the virtual machine execution space 140, service orchestration manager 134 provides virtual machines for the services development environment virtual machine $142_1$ requires. For instance, to make changes to the income tax preparation program, the development environment virtual machine $142_1$ requires access to source code files for the application as well as access to any services that the program interacts with. The service orchestration manager 134 obtains a virtual machine image of a source code repository from the virtual machine image store 152 and initializes, using virtual machine spawner 132, source code repository virtual machine $142_2$ in the virtual machine execution space 140.

Continuing the example, the income tax preparation program may interact with one or more systems while running, such as obtaining information about specific taxing jurisdictions from a server. In order to perform testing and debugging functions, the development environment requires a service to provide the information from the specific taxing jurisdiction server, or similar external interaction. Service orchestration manager 134 obtains these required services for the tax preparation program from the program's configuration file in configuration file store 154, here the taxing jurisdiction server. Service orchestration manager 134 identifies the required services from the configuration file and obtains virtual machine images for each required service from the virtual machine image store 152. Virtual machine spawner 132 executes each of the virtual machine images within a new virtual machine in the virtual machine execution space 140. Thus, the taxing jurisdiction server from the example would be one of potentially many interactive server virtual machines $142_3$ simulating services the program under development interacts with. In this manner, the development environment running in a virtual machine 142 can perform testing and debugging operations by interacting with services running as separate virtual machines 142 all within the virtual execution space 140.

Obtaining multiple virtual machine images for applications and services that execute as separate virtual machines 142 within the virtual machine execution space 140 allows the system to provide a stable virtual development environment by centrally controlling elements that can cause instability, such as application and code file versioning. Further, using virtual machines to provide services allows developers to easily test unusual conditions, both in the operation of the program under development and the resources the program interacts with. Performing testing and debugging operations without interacting with live servers eliminates the risk that the software under development can introducing errors into live databases or otherwise adversely affect live systems. Using a virtual machine 142 to provide source code files allows the system to manage code versions centrally, which eliminates the development environment's dependency on the source code files present on the local machine and the need for the developer to manually guarantee the versions of those files are up to date.

Figure 3:
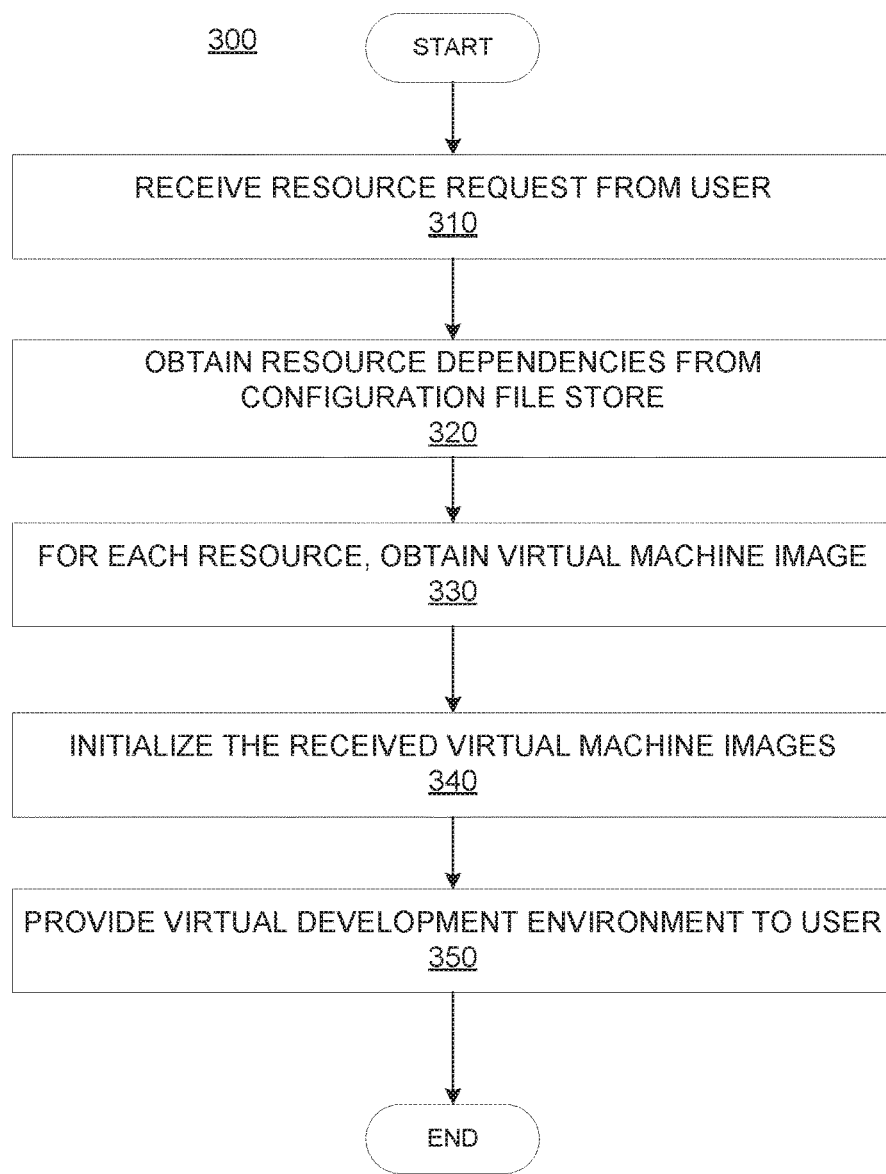
FIG. 3 is a flow chart illustrating a process for provisioning a virtual development environment, according to one embodiment.

FIG. 3 is a flowchart illustrating a process for providing a virtual development environment, according to an embodiment. As shown, process 300 begins at step 310 with dispatcher virtual machine 130 receiving input from a user requesting a resource for the development environment. At step 320, service orchestration manager 134 accesses the configuration file store 154 to obtain a list of resources and services associated with the resource requested by the user. At step 330, service orchestration manager 134 obtains a virtual machine image from virtual machine image store 152 for the resource requested by the user as well as the depended services received from the configuration file store 154. At step 340, virtual machine spawner 132 allocates system resources within the virtual machine execution space 140 for each virtual machine image received from the virtual machine image store 152. At step 350, the provisioned resource is provided to the user within the virtual development environment.

Figure 4:
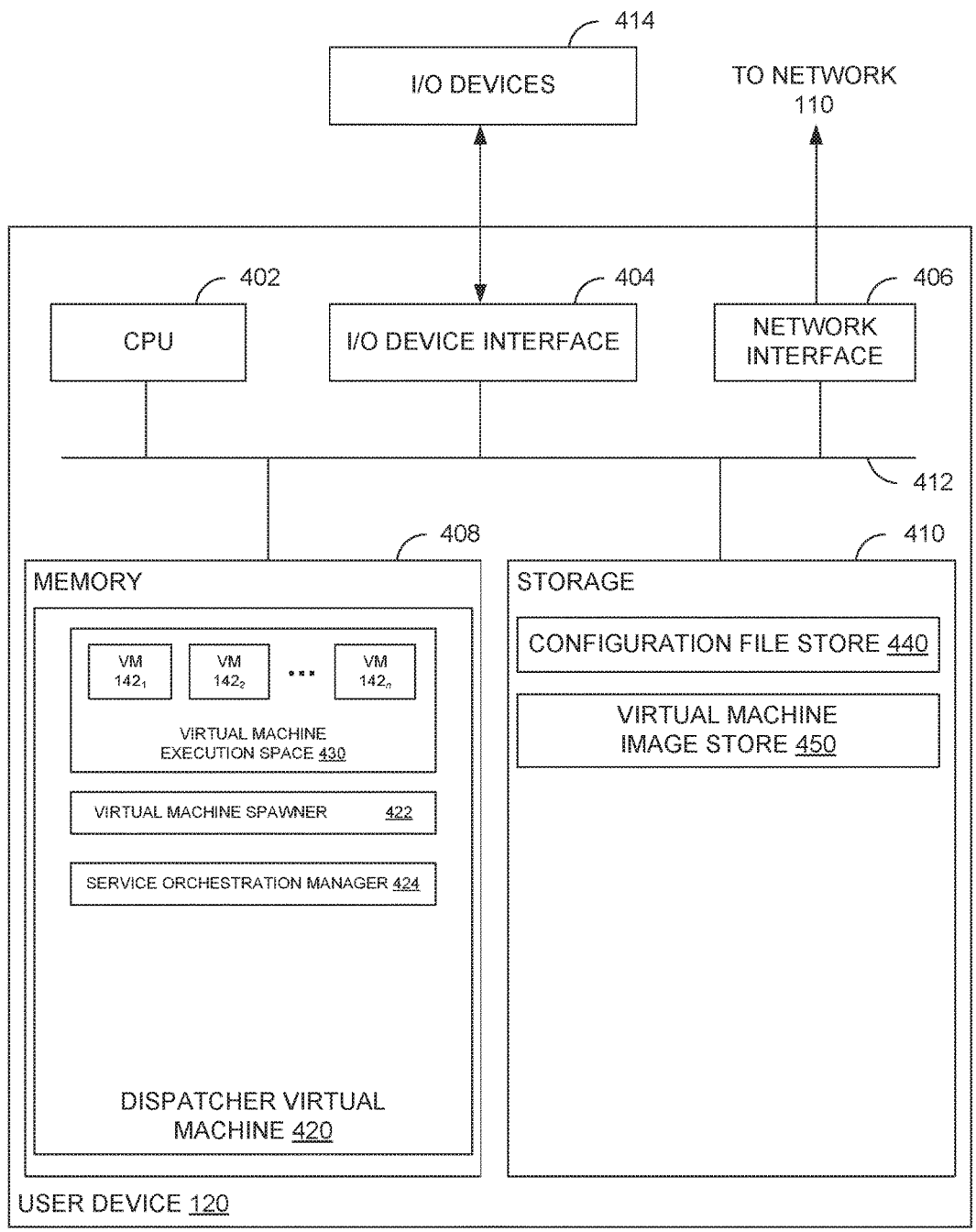
FIG. 4 illustrates an example computing system for providing a virtual development environment, according to one embodiment.

FIG. 4 illustrates a user device 400 that [manages service dependences between virtual machines in a development environment], according to an embodiment. As shown, the system 600 includes, without limitation, a central processing unit (CPU) 402, one or more I/O device interfaces 404 which may allow for the connection of various I/O devices 414 (e.g., keyboards, displays, mouse devices, pen input, etc.) to the system 400, network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 is included to be representative of a single CPU, multiple CPUs, a single CPU having multiple processing cores, and the like. Additionally, the memory 408 is included to be representative of a random access memory. Furthermore, the storage 410 may be a disk drive, solid state drive, or a collection of storage devices distributed across multiple storage systems. Although shown as a single unit, the storage 410 may be a combination of fixed and/or removable storage devices, such as fixed disc drives, removable memory cards or optical storage, network attached storage (NAS), or a storage area-network (SAN).

As shown, memory 408 includes a dispatcher virtual machine 420. Dispatcher virtual machine 420 is generally configured to provide a virtual development environment by receiving user input from I/O devices 414. Service orchestration manager 424 Identifies one or more resources from the user input and accesses the configuration file for each resource in configuration file store 440 in storage 410 to retrieve configuration details, including dependencies, for each resource. Storage orchestration manager 424 retrieves a virtual machine image for each resource from virtual machine image store 450 in storage 410. Virtual machine spawner 422 creates a virtual machine 142 running each virtual machine image within virtual machine execution space 430. Thus, virtual machines $142_1$-$142_n$ in the virtual machine execution space provide a development environment and the resources, such as code libraries and interactive services, allowing a stable development environment.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
receiving a request for a virtual development environment at a dispatcher virtual machine;
identifying, by the dispatcher virtual machine, one or more resources in the request;
retrieving, by the dispatcher virtual machine, configuration data for a resource of the one or more resources from a configuration data store, wherein the configuration data identifies a dependent resource;
obtaining, by the dispatcher virtual machine, a first virtual machine image for the resource;

obtaining, by the dispatcher virtual machine, a second virtual machine image for the dependent resource;

spawning, by the dispatcher virtual machine, a first virtual machine and a second virtual machine by executing, in a virtual machine execution space, the first virtual machine image for the resource and the second virtual machine image for the dependent resource; and providing the virtual development environment to a user with the first virtual machine and the second virtual machine to enable testing and debugging.

2. The method of claim 1, wherein the resource is a source code repository.

3. The method of claim 2, wherein the dependent resource is a database.

4. The method of claim 2, wherein the source code repository includes source code files from a local storage device and a remote storage device.

5. The method of claim 1, wherein the configuration data includes resources to allocate when executing a virtual machine.

6. The method of claim 1 further comprising:

receiving, from the user, a request to test a program in the virtual development environment; and executing the program with a program virtual machine in the virtual machine execution space, wherein the program virtual machine requests and receives data from the second virtual machine.

7. The method of claim 1 further comprising receiving, from the user, a request to modify the virtual development environment, wherein the request includes a second set of resources;

when the resource is not in the second set of resources, terminating the first virtual machine and the second virtual machine;

retrieving additional configuration data from the configuration data store for a given resource of the second set of resources;

obtaining a virtual machine image for the given resource of the second set of resources;

spawning a virtual machine for the given resource by executing, in the virtual machine execution space, the virtual machine image of the given resource of the second set of resources; and providing the virtual development environment to the user with the virtual machine for the given resource.

8. A system, comprising:

a processor; and memory storing instructions which, when executed on the processor, cause the processor to perform an operation for providing a virtual development environment, the operation comprising:

receiving a request for the virtual development environment at a dispatcher virtual machine;

identifying, by the dispatcher virtual machine, one or more resources in the request;

retrieving, by the dispatcher virtual machine, configuration data for a resource of the one or more resources from a configuration data store, wherein the configuration data identifies a dependent resource;

obtaining, by the dispatcher virtual machine, a first virtual machine image for the resource;

obtaining, by the dispatcher virtual machine, a second virtual machine image for the dependent resource;

spawning, by the dispatcher virtual machine, a first virtual machine and a second virtual machine by executing, in a virtual machine execution space, the first virtual machine image for the resource and the second virtual machine image for the dependent resource; and providing the virtual development environment to a user with the first virtual machine and the second virtual machine to enable testing and debugging.

9. The system of claim 8, wherein the resource is a source code repository.

10. The system of claim 9, wherein the dependent resource is a database.

11. The system of claim 9, wherein the source code repository includes source code files from a local storage device and a remote storage device.

12. The system of claim 8, wherein the configuration data includes resources to allocate when executing a virtual machine.

13. The system of claim 8, the operation further comprising:

receiving, from the user, a request to test a program in the virtual development environment; and executing the program with a program virtual machine in the virtual machine execution space, wherein the program virtual machine requests and receives data from the second virtual machine.

14. The system of claim 8, the operation further comprising receiving, from the user, a request to modify the virtual development environment, wherein the request includes a second set of resources;

when the resource is not in the second set of resources, terminating the first virtual machine and the second virtual machine;

retrieving additional configuration data from the configuration data store for a given resource of the second set of resources;

obtaining a virtual machine image for the given resource of the second set of resources;

spawning a virtual machine for the given resource by executing, in the virtual machine execution space, the virtual machine image of the given resource of the second set of resources; and providing the virtual development environment to the user with the virtual machine for the given resource.

15. A computer-readable medium comprising instructions that, when executed by one or more processors, cause the one or more processors to perform an operation for providing a virtual development environment, the operation comprising:

receiving a request for the virtual development environment at a dispatcher virtual machine;

identifying, by the dispatcher virtual machine, one or more resources in the request;

retrieving, by the dispatcher virtual machine, configuration data for a resource of the one or more resources from a configuration data store, wherein the configuration data identifies a dependent resource;

obtaining, by the dispatcher virtual machine, a first virtual machine image for the resource;

obtaining, by the dispatcher virtual machine, a second virtual machine image for the dependent resource;

spawning, by the dispatcher virtual machine, a first virtual machine and a second virtual machine by executing, in a virtual machine execution space, the first virtual machine image for the resource and the second virtual machine image for the dependent resource; and providing the virtual development environment to a user with the first virtual machine and the second virtual machine to enable testing and debugging.

16. The computer-readable medium of claim 15, wherein the resource is a source code repository.

17. The computer-readable medium of claim 16, wherein the dependent resource is a database.

18. The computer-readable medium of claim 16, wherein the source code repository includes source code files from a local storage device and a remote storage device.

19. The computer-readable medium of claim 15, wherein the configuration data includes resources to allocate when executing a virtual machine.

20. The computer-readable medium of claim 15, the operation further comprising:
   receiving, from the user, a request to test a program in the virtual development environment; and
   executing the program with a program virtual machine in the virtual machine execution space, wherein the program virtual machine requests and receives data from the second virtual machine.

\* \* \* \* \*